STORAGE SYSTEM USING FERROELECTRIC CONDENSER

Filed Feb. 24, 1954 3 Sheets-Sheet 1

*INVENTOR.*
DONALD R. YOUNG

*BY* William V. Schelberg
AGENT

Nov. 4, 1958 D. R. YOUNG 2,859,428

STORAGE SYSTEM USING FERROELECTRIC CONDENSER

Filed Feb. 24, 1954 3 Sheets-Sheet 2

INVENTOR.
DONALD R. YOUNG

BY William V Schelberg

AGENT

Nov. 4, 1958 D. R. YOUNG 2,859,428

STORAGE SYSTEM USING FERROELECTRIC CONDENSER

Filed Feb. 24, 1954 3 Sheets-Sheet 3

INVENTOR.
DONALD R. YOUNG
BY William V Schelberg
AGENT 2,859,428

STORAGE SYSTEM USING FERROELECTRIC CONDENSER

Donald R. Young, Poughkeepsie, N. Y., assignor to International Business Machines Corporation, New York, N. Y., a corporation of New York Application February 24, 1954, Serial No. 412,267

9 Claims. (Cl. 340—173)

This invention relates to memory systems and is directed in particular to a matrix system employing ferroelectric capacitors as storage elements.

Ferroelectric materials are so termed because of a similarity in certain characteristics to ferromagnetic materials and a number of such materials are known in the art such as barium titanate, Rochelle salt and potassium niobate, for example. These ferroelectric materials are dielectrics which depend upon internal polarization rather than surface charge for storage. A curve representing dielectric induction plotted versus electric field intensity simulates a hysteresis loop comparable to the B—H curve of ferromagnetic materials.

An object of this invention is to provide a storage array employing ferroelectric condensers wherein binary information may be stored and, at a later interval, read out of storage.

Another object of the invention is to provide a novel diode switching system for reading into and out of a ferroelectric matrix.

Still another object of the invention is to provide a cubical ferroelectric matrix for storage of binary information.

Other objects of the invention will be pointed out in the following description and claims and illustrated in the accompanying drawings, which disclose, by way of example, the principle of the invention and the best mode, which has been contemplated, of applying that principle.

Figure 1:
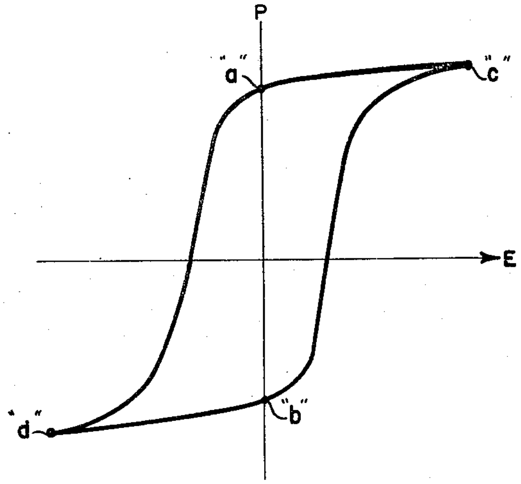
Fig. 1 is a representation of the hysteresis curve for a ferroelectric capacitor such as that employed in the novel storage system.

In ferroelectric capacitors such as that employed in memory systems, materials having substantially rectangular hysteresis loops and low coercive force are desired. The hysteresis loop for a barium titanate crystal of this type is illustrated in Fig. 1 where the vertical axis represents the electrical displacement or degree of polarization (P) and the horizontal axis represents the electric field strength (E), which is proportional to the voltage applied across the condenser terminals. In storing binary information, the state of polarization designated as point "*b*" on the hysteresis loop is arbitrarily selected as representing a binary zero and the state at point "*a*" then represents storage of a binary one. With the ferroelectric capacitor in a zero state "*b*," application of a positive pulse to one terminal causes the hysteresis loop to be traversed from point "*b*" to point "*c*," which is the saturation point, and, on removal of this applied electric field, returns to point "*a*" at which it remains in a stable condition representing a binary one. A negative pulse is applied to the same terminal on readout and, with the capacitor in a state representing a stored binary one, the hysteresis curve is traversed from the point "*a*" to point "*d*" and, when the readout pulse terminates, goes to point "*b*." The slope of the hysteresis curve between points "*a*" and "*d*" is relatively great and, as the slope determines the effective capacitance of the ferroelectric condenser, the change in polarization in going from point "*a*" to point "*d*" presents a large capacitance to the negative read out pulse. Application of the negative read out pulse in interrogating a capacitor which is in a binary zero representing state causes the hysteresis curve to be traversed from point "*b*" to point "*d*" and, on termination of the read out pulse, returns to point "*b*." The slope of the hysteresis curve between points "*b*" and "*d*" is small, and this change in polarization therefore presents a low capacitance to the negative read out pulse.

The points "*a*" and "*b*" on the hysteresis loop are stable states of polarization and binary information thus represented and stored in the dielectric will remain for a considerable period without requiring regeneration or application of external energy for its maintenance. At the stable points "*a*" and "*b*," there is no net field in the ferroelectric condenser or external to it and the polarization charge is equal and opposite to the surface charge. Consequently, conduction through the dielectric does not destroy the information and the external leads may even be shorted without ill effect.

An electric field applied to the ferroelectric condenser of a magnitude sufficient to exceed the coercive force, and in a direction such as to reverse the polarization changes the polarization at a rate determined by the magnitude of the field and, if a negative pulse is applied for reading, either a transition from point "*a*" to point "*b*" or no net change occurs. This transition is equivalent to a net change in the charge across the ferroelectric condenser, as described above, and can be detected as a voltage appearing across a standard condenser connected in series with it.

Figure 2:
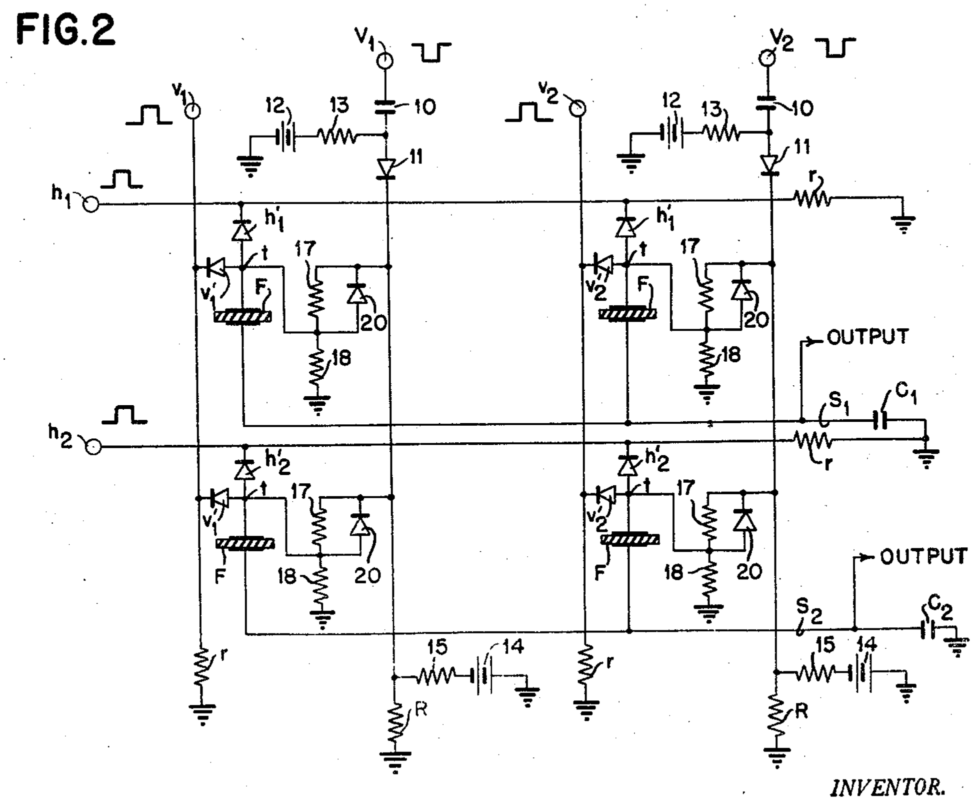
Fig. 2 is a schematic diagram illustrating a two dimensional matrix array of ferroelectric storage elements.

Fig. 2 illustrates an arrangement employing such a method of detecting and distinguishing between binary representations which have been stored in a two dimensional array of ferroelectric elements by causing individual ones of the elements to be selectively charged to one of the stable polarization states "*a*" or "*b*." In this figure, groups of horizontal and vertical coordinate busses are shown designated *h* and *v*, respectively, with subscript labels given to correspond with a particular row or column of the matrix. A ferroelectric condenser storage unit is arranged at the intersection of each horizontal and vertical bus. Only four such intersections are illustrated, however, any number may be employed as desired by providing additional horizontal and vertical busses *h* and *v*. It should be pointed out also that the array need not be symmetrical as shown but that any number of horizontal or vertical busses may be used. At each of the above mentioned intersections, a pair of diodes labeled *v'* and *h'* are provided, with their cathode terminals connected to the correspondingly labeled bus. The anode terminals of these diodes are connected to a common junction point *t* at each intersection and one terminal of a ferroelectric storage capacitor F is also connected to this junction. The other terminal of the ferroelectric capacitor F at each row level is connected to a conductor S corresponding to the particular row which is coupled to a standard condenser C. The other terminal of the condenser C is grounded, so that the standard capacitor and each of the ferroelectric capacitors in a particular row are connected in series between the several terminals *t* and ground. The busses *h* and *v* are employed as input busses and are subjected to positive pulses on read in as will be more fully explained. The terminals opposite those to which input pulses are applied are grounded through series resistors $r$ which are individually connected to each bus in order to provide a return path to input pulse sources not shown.

Intermediate the vertical busses $v$, readout lines V are provided which are connected through a condenser 10 and diode 11 to a resistor R which is grounded at its opposite terminal. At the junction of the condenser 10 and diode 11, a positive potential source 12 is connected to each line V through a resistor 13. At the ungrounded terminal of the resistors R, a negative potential source 14 is connected to the read out lines V by means of a resistor 15. At each bus intersection or storage position, the terminal $t$ is coupled to the midpoint of a pair of series connected resistors 17 and 18. The other terminal of resistor 17 is connected to the associated readout line V and the other terminal of the resistor 18 is grounded. A diode 20 is connected in shunt with the resistor 17 and is poled to block current flow in a direction from the readout line V.

In the initial non-functioning state of the matrix, the busses $h$ and $v$ are maintained at ground potential and each of the diodes $h'$ and $v'$ are in a conductive state with the current paths traced from the positive source terminal 12, through resistor 13, diode 11 and the lead V, resistor 17, the terminal $t$ and through the diodes $h'$ and $v'$ to busses $h$ and $v$ respectively, and thence to ground through the resistors $r$. The resistors $r$ are of low value and the terminals $t$ therefore are substantially at ground potential. In storing binary information, each ferroelectric condenser F is initially in a zero representing polarization state "$b$" (see Fig. 1) and upon simultaneous energization of the selected $h$ and $v$ busses, as for example the $v_1$ and $h_1$ busses, the diodes $v'_1$ and $h'_1$ are rendered nonconductive. Upon this condition, current from bias voltage source 12 flows through resistor 13, diode 11 and the resistors 17 and 18 in series at the intersection of the $v_1$ and $h_1$ busses, and a positive pulse is applied to the terminal of the ferroelectric capacitor connected to this junction $t$. This capacitor F then traverses its hysteresis loop from point "$b$" to point "$c$" and, on termination of the read-in pulses, on bussses $h_1$ and $v_1$, returns to point "$a$" representing a stored binary one. Each of the $h_1'$ diodes and $v_1'$ diodes become non-conductive upon application of the aforementioned positive read in pulses, however, only at the intersection of busses $v_1$ and $h_1$ are both diodes for the storage unit blocked. At the time that the diodes $h_1'$ and $v_1'$ again become conductive, the junction $t$ at this intersection is again lowered to ground potential. The positive voltage of source 12, when applied across the ferroelectric condenser F during the interval that the diodes $v_1'$ and $h_1'$ are non-conductive, causes the hysteresis loop of the ferroelectric capacitor to be traversed from the point "$b$" to point "$c$" and an appreciable slope is encountered. The capacitance of the ferroelectric capacitor at this time is great in comparison with that of the series connected standard condenser and a voltage pulse appears across the terminals of condenser C due to the change in charge across the ferroelectric capacitor F. The output circuits adapted to receive pulses from the matrix are normally gated to be receptive only at a read out time interval and pulses appearing at this read in time are ineffective.

At this point, it may be noted that storage of binary ones may be accomplished as described and storage of binary zeros is accomplished by failure to pulse the particular horizontal input bus $h$. Storage may then be accomplished in parallel in each column of the array by selectively pulsing the $h$ busses simultaneously and in coincidence with the pulsing of the proper vertical bus $v$. In this manner, a group of binary digits may be stored as a word in a particular column of the matrix and this word may also be read out in parallel as will now be described.

In performing a read out operation, the line V associated with the column in which a particular word is stored is pulsed negatively at its ungrounded terminal. The voltage of source 12 is momentarily rendered ineffective as its current path is now diverted through the condenser 10 to the readout terminal and the negative pulse source. The negative potential source 14 now becomes effective to lower the potential of the particular readout bus V and a current path to this source may be traced from ground, through the resistor 18 and diode 20 at the bias intersections of the particular word column and through the readout bus V, resistor 15 and to the negative source 14 which is grounded at one terminal as shown. The diodes $v'$ and $h'$ at each intersection of the column are non-conductive and these terminals $t$ are thus subjected to a negative voltage pulse. This shift voltage drives the terminal of each ferroelectric condenser F in that column negative so that those which are standing at the limiting polarization state "$a$" (Fig. 1), representing storage of binary ones, are caused to traverse their hysteresis loops to the point "$d$" and, on termination of the read out pulse, return to point "$b$." In shifting from point "$a$" to point "$b$," a high capacitance is presented by the ferroelectric capacitors to the voltage pulse. Those ferroelectric capacitors standing at the zero representing point "$b$" prior to read out, traverse their hysteresis loops from the point "$b$" to point "$d$" and return to point "$b$" on termination of the pulse, thus presenting a low capacitance. The series connected standard condensers C associated with each row of storage condenser positions exhibits either a low or high voltage drop across their terminals depending upon the polarization state of the associated ferroelectric storage capacitor at the time of read out as the capacitance of the condenser C will be either high or low compared with that of the ferroelectric capacitor. An output voltage indication then is obtained in parallel across the condensers C at each row level and the word stored in the particular column of ferroelectric condensers is read-out of the matrix. It is to be noted that this read out operation restores each of the condensers F to a zero representing state "$b$" in readiness for storage of additional binary information. The use of diode switching matrices in selection of a storage location as described relaxes the requirements on the ferroelectric materials forming the storage elements.

Figure 3:
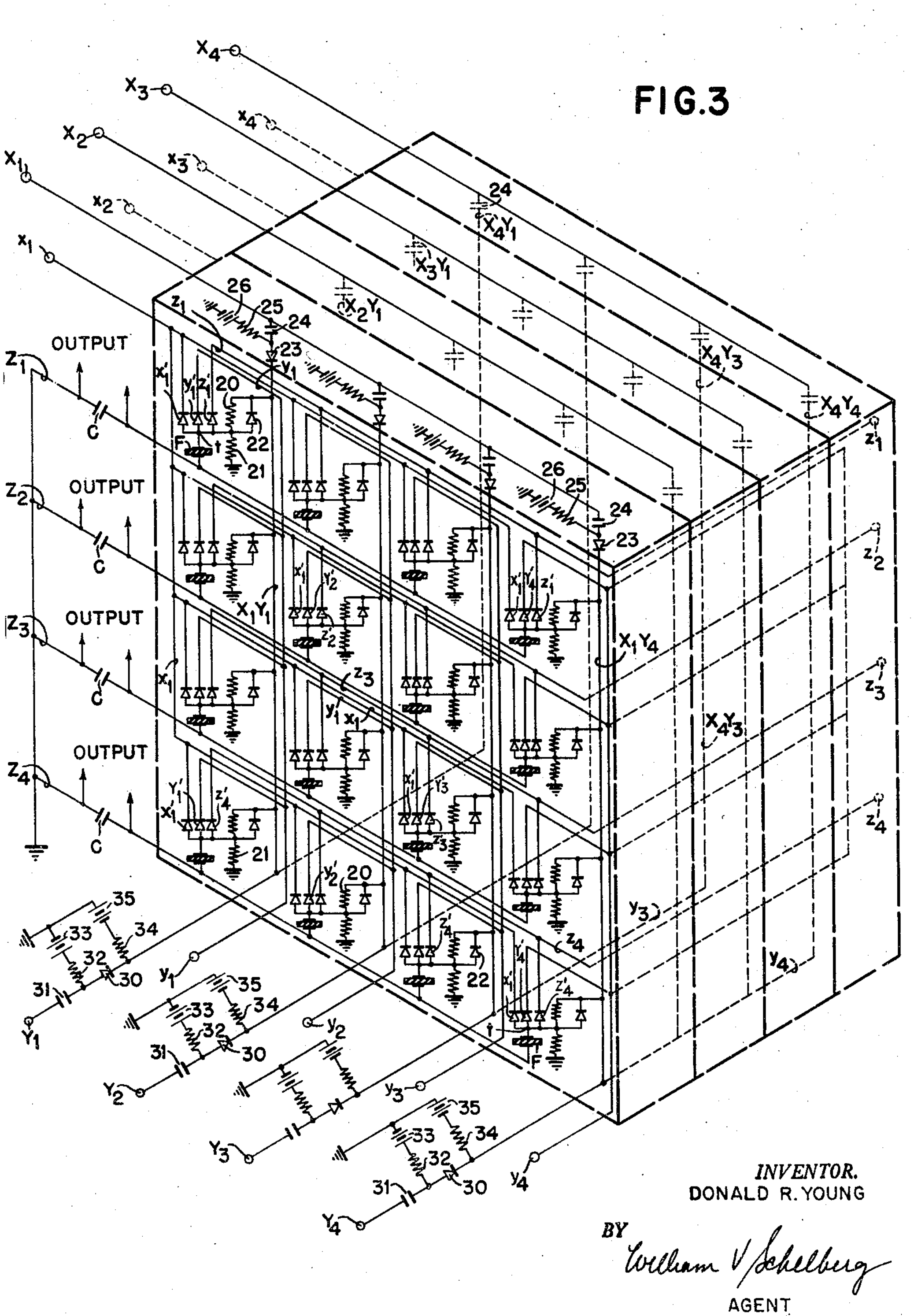
Fig. 3 is a schematic diagram of a three dimensional ferroelectric storage array.

A further arrangement employing the aforementioned method of detecting and distinguishing between binary representations which are stored in ferroelectric elements is shown in Fig. 3 where a cubical array is illustrated. In this figure, three groups of parallel busses are arranged at right angles to one another and are designated X, Y and Z, respectively, in conformity with the practice of labeling the three dimensions of a solid geometric figure. For purposes of illustration, four conductors having subscript labels 1, 2, 3 and 4, comprise each group of parallel leads, however, it is again obvious that any number may be employed depending upon the storage capacity desired. A ferroelectric storage condenser circuit is located at the intersection of each of the X, Y and Z plane leads and thus provides for storage of 64 bits of binary information in the illustrated array. The intersection of X and Y plane busses provides a word line comprising four bits and with each X or Y plane containing four such word lines. Each line may be provided with as many bit positions as desired as the cubical array need not be symmetrical.

Figure 4:
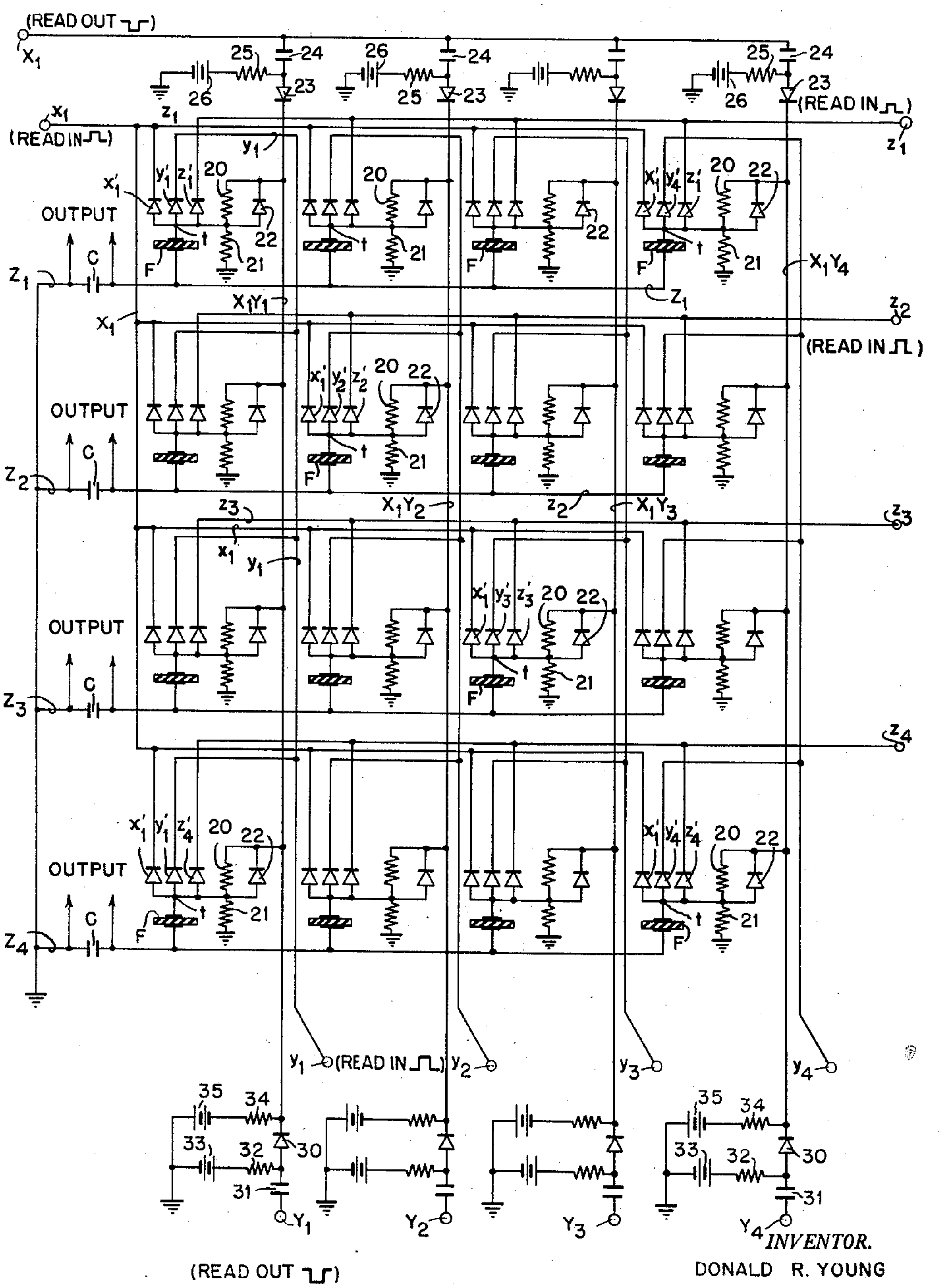
Fig. 4 is a diagram of a portion of the array shown in Fig. 3 in greater detail.

To more clearly describe the electrical structure and operation of the array, the $X_1$ plane of the cubical array is illustrated in greater detail in Fig. 4. As shown in this figure, four ferroelectric storage units are arranged in each vertical column representing a word line and four columns of units are provided as the Y planes intersect with the $X_1$ plane in four word lines. Each storage unit comprises a ferroelectric condenser F connected at one terminal to a lead corresponding to the Z planes of the cubical array with the row of units corresponding to the $Z_1$, $Z_2$, $Z_3$, and $Z_4$ planes connected to the correspondingly labeled lead. Each of the Z leads connect with a standard condenser C across which the output is taken. The other terminal of each ferroelectric condenser is connected to a junction $t$ which is coupled to the cathode terminal of three diodes labeled $x'$, $y'$ and $z'$. These diodes are given appropriate subscripts corresponding with the particular storage position occupied by the associated ferroelectric capacitor F and form a diode switching matrix. The junction $t$ is also connected to the midpoint of a pair of series connected resistors 20 and 21 with the other terminal of resistor 21 grounded and that of resistor 20 connected to the related word line conductor XY. The resistor 20 is shunted by a diode 22, which is poled as shown in the figure. The upper terminal of each XY lead is connected through a diode 23 and associated decoupling condenser 24 to the $X_1$ plane readout lead which is labeled to identify it with the $X_1$ plane. The junction of each diode 23 and condenser 24 is connected through a resistor 25 to a positive source terminal 26. The lower terminal of each word line XY is connected, through a diode 30 and condenser 31, to the appropriate Y plane read out lead which, as before mentioned, is labeled to correspond to the several Y planes which intersect the illustrated $X_1$ plane of the cubical array. The junction of each of the diodes 30 and condensers 31 is connected through a resistor 32 to a positive source terminal 33, equal in potential to the source 26, and each of the leads XY is connected to a negative potential source 35 through a resistor 34. An $X_1$ plane input lead $x$ connects each of the diodes $x'_1$, and an input lead $y$ for each Y plane and an input lead $z$ for each Z plane are connected to the diodes at each bus intersection having corresponding subscripts. All $z'$ diodes in each row and all the $y'$ diodes in each column are connected to input lines labeled $y$ and $z$ which have corresponding subscript labels.

The group of three diodes $x'$, $y'$ and $z'$ form a logical plus And circuit connected to one terminal of each ferroelectric condenser F. Normally, the anode terminal of these diodes is maintained at ground potential and they are conductive in a path traced from the bias sources 26 and 33, through the resistors 25 and 34, the diodes 23 and 30 respectively, the XY lead, resistor 20 to junction $t$ and thence through the $x'$ $y'$ and $z'$ diodes to the appropriate input conductors $x$, $y$ and $z$ which are maintained at ground potential. Under this condition, the terminal of the ferroelectric condensers F which is connected to the junction $t$, is also substantially at ground potential. To store a binary one in any one of the storage positions, a positive voltage pulse is simultaneously applied to each of the appropriate $x$, $y$ and $z$ plane input terminals corresponding with that position. For example, if a one is to be stored in the ferroelectric capacitor occupying the $X_1$ $Y_1$ $Z_1$ plane intersection, the $x_1$, $y_1$ and $z_1$ input lines are pulsed. As a result, the diodes $x_1'$, $y_1'$ and $z_1'$ are rendered non-conductive and junction $t$ rises to the positive potential of the bias sources 26 and 33. This applied voltage supplies an electric field of sufficient magnitude to cause the ferroelectric condenser F to traverse its hysteresis loop from point "$b$" to point "$c$" and, on termination of the $x_1$, $y_1$ and $z_1$ input pulses, to return to point "$a$" representing storage of a binary one. At this time, the diodes $x_1'$, $y_1'$ and $z_1'$ again become conductive and junction $t$ is lowered to ground potential. As the positive voltage of sources 26 and 33 is applied across the ferroelectric condenser F and standard condenser C in series, a voltage pulse appears across the latter as a high capacitance is presented to the voltage pulse by the ferroelectric capacitor in traversing its hysteresis loop from point "$b$" to point "$c$," during which change an appreciable slope in the curve is encountered. Such an output pulse has no effect, however, regardless of magnitude since circuits adapted to accept the read out pulse conventionally are gated to be conductive only during predetermined readout intervals, as before mentioned.

In a similar manner, binary information may be stored in the ferroelectric condensers at other positions in the matrix and it is to be noted that read in may be accomplished to a plurality of storage positions either simultaneously or individually as desired. For example, if information is to be stored in parallel (simultaneous entry) in the word line $X_1$ $Y_1$, the appropriate ones of the Z plane input leads $z$ are selectively pulsed coincidentally with the pulsing of the $x_1$ and $y_1$ input leads. Storage of the binary word 1011 would then require pulsing the $z_1$, $z_3$ and $z_4$ input lines at the same time as the $x_1$ and $y_1$ input lines.

In order to read out each element of this word at a later time, the readout lines $X_1$ and $Y_1$ are simultaneously driven negative from a pulse source not shown and the bias applied at the terminals 26 and 33 momentarily find current paths through their associated resistors 25 and 32 and coupling capacitors 24 and 31. The potential of the word line $X_1$ $Y_1$ then drops to the negative voltage of source 35 and each of the terminals $t$ is coupled through its associated diodes 22 to the line $X_1$ $Y_1$, the resistor 34 and the negative source 35. The shift in voltage on line $X_1$ $Y_1$ drives the upper terminal of each ferroelectric storage condenser F negative and those which exist at the limiting polarization state "$a$" (Fig. 1) are caused to shift their positions to point "$d$" and thence to point "$b$." For the example taken of the binary word 1011, the ferroelectric condensers in the $X_1$ $Y_1$ word column which are associated with the $Z_1$ $Z_3$ and $Z_4$ planes will shift between the two limiting polarization states "$a$" and "$b$" while that storage condenser associated with plane $Z_2$ will shift from point "$b$" to point "$d$" and return to point "$b$." In shifting from point "$a$" to point "$b$," a high capacitance is presented to the voltage pulse while in shifting from point "$b$" to "$d$" and return presents a low capacitance. The series connected fixed condensers C associated with each Z plane storage condenser in the word column then either exhibit a low or high voltage drop depending upon the polarization state of the ferroelectric capacitor at the time of read out since the capacitance of the standard output condenser C will then either be high or low compared to that of the ferroelectric capacitor F. A negligible output voltage, indicative of storage of binary ones in the $Z_1$, $Z_3$, $Z_4$ positions of the word line therefore appears simultaneously across the associated capacitors C and each part of the binary word is read out of storage in parallel.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A storage system of the type described comprising a ferroelectric capacitor, an And circuit coupled to one terminal of said ferroelectric capacitor and operative to normally maintain said terminal at ground potential, a positive bias source and a negative bias source coupled to said terminal, a standard condenser connected to the opposite terminal of said ferroelectric capacitor, means rendering said And circuit ineffective and subjecting said one terminal of the ferroelectric capacitor to a positive voltage excursion from said positive bias source on read in of binary information, means rendering said positive bias source ineffective and subjecting said one terminal of the ferroelectric capacitor to a negative voltage excursion from said negative bias source on read out, and output circuit means connected across said standard condenser.

2. A two dimensional ferroelectric storage matrix comprising a first set of input busses, a second set of overlapping input busses, and And circuit comprising a pair of diodes individually connected at one terminal to the busses of said first and second set at each bus intersection, a ferroelectric capacitor connected at one terminal to the other terminal of said diodes, a positive bias source connected to said one terminal, a negative bias source connected to said one terminal, a standard condenser coupled to the opposite terminal of said ferroelectric capacitor, read in means for selectively pulsing individual ones of said sets of busses and rendering said And circuit inoperative so that said one terminal of the ferroelectric capacitor is subjected to a positive voltage excursion from said positive bias source, readout means for rendering said positive bias source ineffective and subjecting said one terminal of the ferroelectric capacitor to a negative voltage excursion from said negative bias source, and output circuit means connected across said standard condenser.

3. A cubical ferroelectric storage matrix of the type described, comprising, three groups of parallel busses arranged in separate intersecting planes, ferroelectric storage means located at the juncture of busses in each plane and comprising an And circuit having a diode connected to each of said busses and to one terminal of a ferroelectric storage capacitor, positive and negative bias sources connected to said one terminal of the ferroelectric capacitor at each bus intersection, a standard output condenser connected to the other terminal of the ferroelectric capacitors in each row of one plane, read in means for selectively pulsing the busses in each plane and rendering certain of said And circuits inoperative so that said one terminal of certain ones of the ferroelectric capacitors is subjected to a positive voltage from said positive bias source, read out means for rendering said positive source ineffective and subjecting said one terminal of certain of said ferroelectric capacitors to a negative voltage from said negative bias source, and output circuit means connected across said standard condensers.

4. A ferroelectric storage system comprising, a ferroelectric capacitor, And circuit means coupled to one terminal of said ferroelectric capacitor, sources of positive and negative voltage coupled to said one terminal, a standard condenser coupled to the opposite terminal of said ferroelectric capacitor, means for normally applying substantially zero potential to said one terminal through said And circuit, means for selectively rendering said And circuit inoperative and applying a voltage pulse from said positive source to said one terminal in storing a binary digit, means for rendering said positive source ineffective and applying a voltage pulse from said negative source to said one terminal on read out, and output circuit means connected across said standard condenser.

5. A storage system of the type described comprising a ferroelectric capacitor, a diode And circuit coupled to one terminal of said ferroelectric capacitor and operative to normally maintain said one terminal at a first potential, a standard capacitor coupled to the opposite terminal of said ferroelectric capacitor, means rendering said And circuit inoperative and subjecting said one terminal to a second potential higher than said first potential on read in of binary information, means subjecting said one terminal to a third potential lower than said first potential on read out of stored information, and output circuit means connected across said standard capacitor.

6. A storage matrix comprising an array of ferroelectric capacitors arranged in coordinate rows and columns, a first set of input busses arranged in one coordinate direction corresponding with said columns, a second set of input busses arranged in a coordinate direction corresponding with said rows, a diode And circuit connected to said busses at each coordinate intersection thereof and to one terminal of a corresponding ferroelectric capacitor, a standard capacitor connected to the opposite terminal of said ferroelectric capacitor, means for applying a potential of one polarity to said one terminal of a selected one of said ferroelectric capacitors on coincident application of pulses to selected ones of said input busses, means for applying a potential of opposite polarity to said one terminal of said ferroelectric capacitor, and output circuit means connected across said standard capacitor.

7. A memory system comprising a ferroelectric capacitor capable of assuming one of two alternate stable states of polarization representative of binary information, a logical And circuit connected to one terminal of said ferroelectric capacitor, a standard capacitor coupled to the opposite terminal of said ferroelectric capacitor, means for causing said ferroelectric capacitor to assume one of said stable states of polarization on coincident application of pulses to said And circuit, means coupled to said one terminal of said ferroelectric capacitor for causing said ferroelectric capacitor to assume the other of said stable states of polarization, and output circuit means connected across said standard capacitor.

8. A storage matrix comprising a plurality of ferroelectric capacitors each capable of assuming one of two alternate stable states of polarization representative of binary information, said ferroelectric capacitors being arranged in coordinate rows and columns, a first set of input busses arranged in a coordinate direction corresponding with said columns, a second set of input busses arranged in a coordinate direction corresponding with said rows, a diode And circuit connected to said busses at each coordinate intersection thereof and to one terminal of a corresponding ferroelectric capacitor, a standard capacitor connected to the opposite terminal of said ferroelectric capacitors in each said row, read in means for applying coincident pulses to one of said column input busses and selected ones of said row busses in causing selected ones of said ferroelectric capacitors to assume one of said stable states of polarization in storing a binary word in said column, read out means for causing each of said ferroelectric capacitors in a selected column to assume the other of said states of polarization, and output circuit means connected across said standard capacitors.

9. A binary storage system of the type described comprising a ferroelectric capacitor capable of assuming alternate states of polarization, a diode And circuit coupled to one terminal of said ferroelectric capacitor and operative to normally maintain said one terminal at a first potential, means for rendering said And circuit inoperative and subjecting said one terminal to a potential higher than said first potential on read in of binary information, means subjecting said one terminal to a potential lower than said first potential on readout of stored information and means coupled to the opposite terminal of said ferroelectric capacitor for determining which one of said stable states had been stored.

References Cited in the file of this patent

UNITED STATES PATENTS 2,717,372 Anderson ______________ Sept. 6, 1955

OTHER REFERENCES

Publication I, Electrical Engineering, October 1952, pp. 916–22.

Publication II, Proc. of West. Comp. Conf., June 1953, pp. 149–153, 158–59.